US008363167B2

(12) United States Patent
Ota et al.

(10) Patent No.: US 8,363,167 B2
(45) Date of Patent: Jan. 29, 2013

(54) IMAGE PROCESSING APPARATUS, IMAGE PROCESSING METHOD, AND COMMUNICATION SYSTEM

(75) Inventors: Masashi Ota, Tokyo (JP); Toshimichi Hamada, Tokyo (JP); Kiyoshi Ikeda, Kanagawa (JP); Hiromasa Naganuma, Chiba (JP); Yoichi Hirota, Kanagawa (JP); Naomasa Takahashi, Chiba (JP)

(73) Assignee: Sony Corporation (JP)

( * ) Notice: Subject to any disclaimer, the term of this patent is extended or adjusted under 35 U.S.C. 154(b) by 534 days.

(21) Appl. No.: 12/589,269

(22) Filed: Oct. 21, 2009

(65) Prior Publication Data

US 2010/0110301 A1 May 6, 2010

(30) Foreign Application Priority Data

Nov. 5, 2008 (JP) ................................ P2008-284070

(51) Int. Cl.
*H04N 5/14* (2006.01)

(52) U.S. Cl. ........................................ 348/671; 348/441

(58) Field of Classification Search .................. 348/671, 348/674, 179, 725, 553–555, 441; 382/162, 382/167, 164–165, 252, 274, 275; 345/89, 345/600, 690, 596, 589, 590, 591, 597, 601–602; *H04N 5/14*

See application file for complete search history.

(56) References Cited

U.S. PATENT DOCUMENTS

| | | | | |
|---|---|---|---|---|
| 5,892,496 | A * | 4/1999 | Wakeland | 345/694 |
| 6,266,102 | B1 * | 7/2001 | Azuma et al. | 348/671 |
| 6,693,642 | B1 * | 2/2004 | Ogawa | 345/589 |
| 7,565,530 | B2 * | 7/2009 | Kwak et al. | 713/156 |
| 7,738,000 | B2 * | 6/2010 | Furukawa et al. | 345/690 |
| 8,064,689 | B2 * | 11/2011 | Arai et al. | 382/162 |

FOREIGN PATENT DOCUMENTS

| | | | |
|---|---|---|---|
| EP | 1434195 | A1 | 6/2004 |
| JP | 10105116 | A | 4/1998 |
| JP | 2003163882 | A | 6/2003 |
| JP | 2003319298 | A | 11/2003 |
| JP | 2004088437 | A | 3/2004 |
| JP | 2008228104 | A | 9/2008 |
| JP | 2009-135613 | A | 6/2009 |

OTHER PUBLICATIONS

European Search Report, EP 09175072, dated Feb. 1, 2010.

Hitoshi, Kiya, "Understandable Digital Image Processing", Version 6, CQ Publishing Co., Ltd., pp. 196-213, Jan. 2000.

Office Action from Japanese Application No. 2008-284070, dated Sep. 28, 2010.

* cited by examiner

*Primary Examiner* — Trang U Tran

(57) ABSTRACT

An information processing apparatus includes: a processing system performing processing on an original image; and a gradation conversion section having a gradation conversion function of receiving image data from the processing system, converting a number of bits of the image data, and expressing pseudo grayscales before the gradation conversion in a grayscale converted image, the gradation conversion section being capable of changing the gradation conversion function and performing conversion processing on the image, wherein the gradation conversion section adds and outputs a determination flag indicating whether the gradation conversion processing has been performed at the time of outputting the image data.

7 Claims, 6 Drawing Sheets

IMAGE PROCESSING APPARATUS, IMAGE PROCESSING METHOD, AND COMMUNICATION SYSTEM

CROSS-REFERENCE TO RELATED APPLICATION

The present application claims priority from Japanese Patent Application No. JP 2008-284070 filed in the Japanese Patent Office on Nov. 5, 2008, the entire content of which is incorporated herein by reference.

BACKGROUND OF THE INVENTION

1. Field of the Invention

The present invention relates to an image processing apparatus having a function of gradation-conversion or grayscale-conversion processing for converting a number of bits, to an image processing method, and to a communication system.

2. Description of the Related Art

For example, in order to display an image having a pixel value of N bits on a display apparatus displaying images with a pixel value of M bits, where M is less than N, it is necessary to convert an N-bit image into an M-bit image, that is to say, to perform gradation conversion processing in order to convert image gradations.

As a method for converting grayscale from an N-bit image to an M-bit image, for example, there is a familiar method of quantization into M-bit pixel values by simply rounding down low-order N−M bits of N-bit pixel values.

In the gradation conversion using the quantization, for example, 8 bits allow 256 ($=2^8$) grayscales, but 4 bits allow only 16 ($=2^4$) grayscales.

Accordingly, in gradation conversion in which an 8-bit grayscale image is quantized into high-order 4 bits by rounding down low-order bits, banding, in which a change in grayscale appears as a band, occurs.

In order to prevent such banding and to express pseudo grayscales before gradation conversion has been performed in an image after gradation conversion, for example, there is a famous error diffusion method.

By the error diffusion method, for example, in an image of 16 grayscales obtained by gradation conversion of an image of 256 grayscales, 256 grayscales are visually expressed for a human eye using 16 grayscales.

That is to say, if low bits are simply rounded down, quantization errors become conspicuous in a displayed image, and thus it is difficult to maintain image quality.

Accordingly, a method of performing delta-sigma modulation on an image, in which such quantization errors are modulated to high-frequency bands in consideration of human visual characteristics, is famous as an error diffusion method.

In general, a two-dimensional filter filtering quantization errors is used for error diffusion.

For the two-dimensional filter, a filter of Jarvis, Judice&Ninke, and a filter of Floyd&Steinberg are familiar (For example, refer to written by Hitoshi KIYA, "Understandable Digital Image Processing", ver. 6, CQ Publishing Co., Ltd., pp. 196-213, January 2000).

SUMMARY OF THE INVENTION

Incidentally, it is thought that not two-dimensional, but one-dimensional delta-sigma modulation is performed.

In a video-signal recording and playback apparatus performing image processing, it is possible to employ a one-dimensional super bit mapping (SBM) processing function.

In this regard, the SBM processing is a technique which makes it possible to transmit a signal without dropping multiple-bit components by adding high-frequency noises in accordance with human visual characteristics at the time of rounding a multiple-bit signal processing result into a certain number of bits.

However, when a video-signal recording and playback apparatus, etc., as a source device, performs the SBM processing and outputs the signal, the SBM effect is sometimes reduced by video signal processing of a connected sink device, such as a television receiver, etc.

For example, when a video signal of 4:2:2 band is subjected to SBM processing, and is output as 4:4:4, there are cases where the signal is re-converted into 4:2:2 again for certain reasons of the video-signal processing of a sink device.

In this case, although various symptoms appear depending on a method of processing a video signal of the sink device, there is a possibility of completely losing the effect of SBM in some cases.

Also, in a game mode, which is provided as an existing technique, the purpose of the mode is to minimize a delay on the side of a television receiver as its effect, and thus signal processing of the television receiver is also different.

Also, a selection of a game mode is made manually, and automatic switching is not supported.

It is desirable to provide an image processing apparatus, an image processing method, and a communication system which are capable of informing a receiving apparatus of a visual signal whether gradation conversion processing has been performed or not.

According to an embodiment of the present invention, there is provided an information processing apparatus including: a processing system performing processing on an original image; and a gradation conversion section having a gradation conversion function of receiving image data from the processing system, converting a number of bits of the image data, and expressing pseudo grayscales before the gradation conversion in a grayscale converted image, the gradation conversion section being capable of changing the gradation conversion function and performing conversion processing on the image, wherein the gradation conversion section adds and outputs a determination flag indicating whether the gradation conversion processing has been performed at the time of outputting the image data.

According to another embodiment of the present invention, there is provided A method of processing an image, including the steps of: performing processing on an original image by a processing system; performing a gradation conversion by a gradation conversion section using a gradation conversion function of converting a number of bits of image data and expressing pseudo grayscales before the gradation conversion in a grayscale converted image in accordance with change control; and adding and outputting a determination flag indicating whether the gradation conversion processing has been performed at the time of outputting the image data.

According to another embodiment of the present invention, there is provided A communication system including: a source device; a sink device; and a cable connecting the source device and the sink device, wherein the source device includes a processing system performing processing on an original image, and a gradation conversion section having a gradation conversion function of receiving image data from the processing system, converting a number of bits of the image data, and expressing pseudo grayscales before the gradation conversion in a grayscale converted image, the gradation conversion section being capable of changing the gradation conversion function and performing conversion processing on the image, wherein the gradation conversion section adds and outputs a determination flag indicating whether the gradation conversion processing has been performed at the time of outputting the image data, and the sink device performs signal processing capable of holding an effect of the gradation conversion processing if the determination flag indicates that the gradation conversion processing has been performed.

By the present invention, it is possible to inform a receiving apparatus of an image signal whether gradation conversion processing has been performed or not.

As a result, it becomes possible to perform signal processing at the receiving apparatus in accordance with whether gradation conversion processing has been performed or not.

DESCRIPTION OF THE PREFERRED EMBODIMENTS

In the following, a description will be given of an embodiment of the present invention with reference to the drawings.

In this regard, the description will be given in the following order.

1. First embodiment (an example of a basic configuration of a communication system)

2. Second embodiment (an example of a configuration of a recording and playback apparatus to which an information processing apparatus is applied)

3. Third embodiment (an example of a configuration of a television receiver as a sink device)

1. First Embodiment

Figure 1:
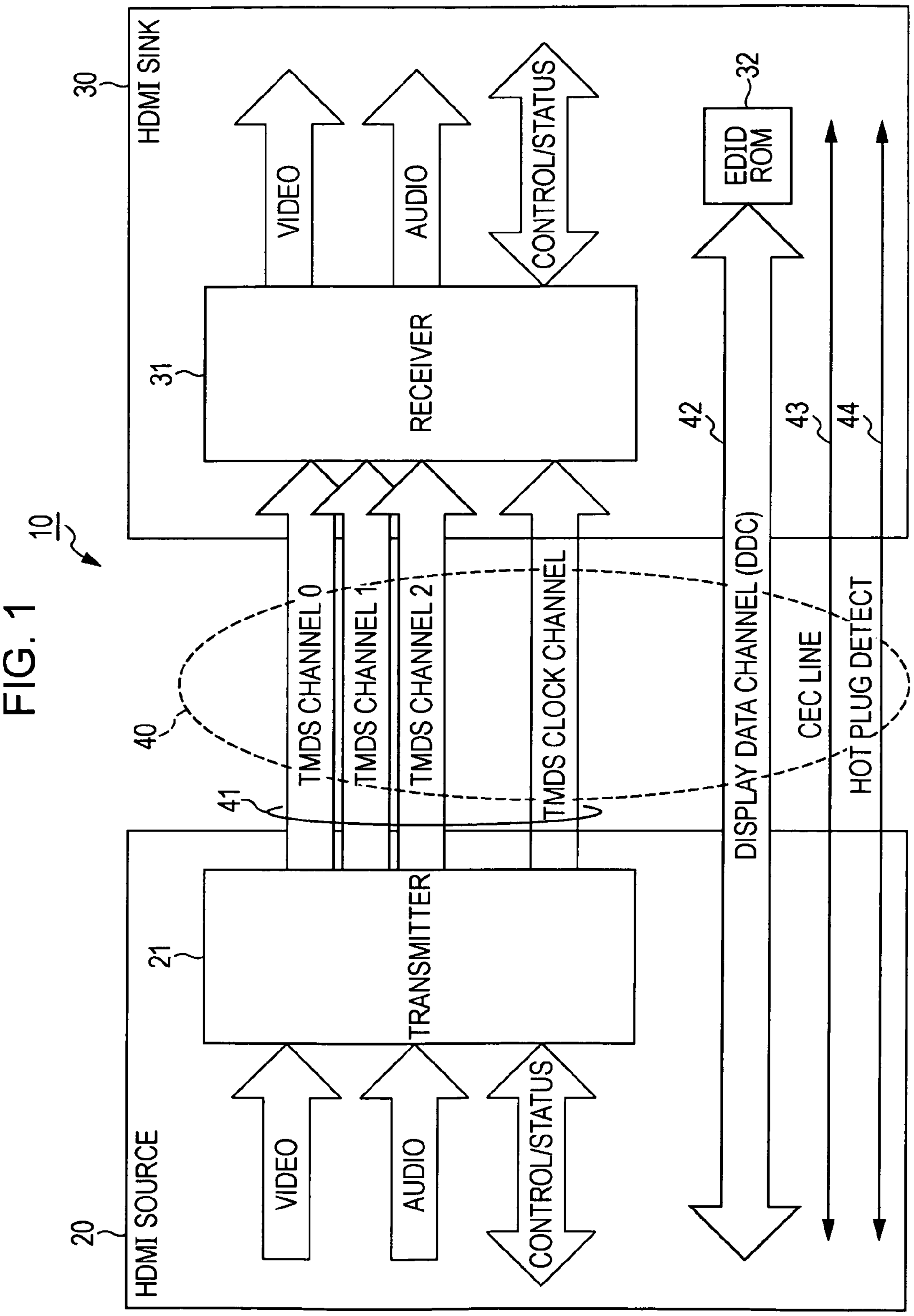
FIG. 1 is a diagram illustrating an example of a communication system according to a first embodiment of the present invention.

FIG. 1 is a diagram illustrating an example of a communication system according to a first embodiment of the present invention.

This communication system 10 illustrates an example of a configuration in which, for example, HDMI (High Definition Multimedia Interface), which is capable of transmitting pixel data of a non-compressed image at a high speed in one direction, is employed as a communication interface.

The communication system 10 employs HDMI as a communication interface from a DVD (Digital Versatile Disc) recorder, a set-top box, and the other AV (Audio Visual) sources to a television receiver, a projector, and the other display units.

The communication system 10 has an HDMI source 20, an HDMI sink 30, and an HDMI cable 40.

In the communication system 10, the HDMI source 20 and the HDMI sink 30 are connected through one line of the HDMI cable 40.

The HDMI source 20 and the HDMI sink 30 can perform the bi-directional IP communication at a high speed using the HDMI cable 40.

A detailed description will be given later of a specific example of the case where a video-signal recording and playback apparatus is employed as the HDMI source 20 and a television receiver is employed as the HDMI sink 30.

As described in detail later, the video-signal recording and playback apparatus as the HDMI source 20 has an SBM processing function.

The video-signal recording and playback apparatus sends a determination signal (flag) for informing the HDMI sink 30 that the SBM processing has been performed in addition to a video signal at the time of outputting a video signal having been subjected to the SBM processing.

The television receiver as the HDMI sink 30 is configured so as to allow giving information to a display device, etc., without reducing the effectiveness of SBM by changing signal processing in accordance with the determination signal.

The HDMI cable 40 includes transmission channels called a TMDS (Transition Minimized Differential Signaling) channel 41, a DDC (Display Data Channel) 42, a CEC (Consumer Electronics Control) line 43.

Also, the HDMI cable 40 includes a signal line 44, which is connected to a pin, called “Hot Plug Detect”.

The TMDS channel 41 is a channel for performing one-directional communication from the HDMI source 20 to the HDMI sink 30.

The CEC line 43 functions as a channel for performing bi-directional communication between the HDMI source 20 and the HDMI sink 30.

The CEC line 43 is formed by one signal line, not shown in the figure, included in the HDMI cable 40. The CEC line 43 is used for performing bi-directional communication of control data between the HDMI source 20 and the HDMI sink 30.

Also, the HDMI source 20 and the HDMI sink 30 transmits frames conforming to IEEE (Institute of Electrical and Electronics Engineers) 802.3 to the HDMI sink 30 and the HDMI source 20, respectively through the DDC 42 or the CEC line 43. Thus, bi-directional IP communication is possible.

Further, the HDMI source 20 and the HDMI sink 30 can detect a connection of a new electronic apparatus, that is to say, an HDMI sink 30 or an HDMI source 20 using the signal line 44.

The HDMI source 20 transmits a digital television signal, that is to say, pixel data of a non-compressed (baseband) image and audio data accompanying the image to the HDMI sink 30 at a high speed through the HDMI cable 40.

The HDMI source 20 transmits, in one direction, a differential signal corresponding to non-compressed image data for one screen to the HDMI sink 30 through a plurality of channels in an effective image interval, which is a difference when a horizontal blanking interval and a vertical blanking interval are subtracted from a period from one vertical synchronization signal to the next vertical synchronization signal.

The HDMI source 20 transmits, in one direction, a differential signal corresponding to at least audio data, control data, the other auxiliary data, etc., which accompany an image, to the HDMI sink 30 through the plurality of channels in a horizontal blanking interval or a vertical blanking interval.

That is to say, the HDMI source 20 has a transmitter 21.

The transmitter 21 converts, for example, pixel data of a non-compressed image into a corresponding differential signal, and serially transmits, in one direction, the differential signal to the HDMI sink 30 connected on a plurality of channels, that is, three TMDS channels #0, #1, and #2 through the HDMI cable 40.

The transmitter 21 converts audio data accompanying the non-compressed image, the necessary control data, and the other auxiliary data, etc., into corresponding differential signals, and serially transmits, in one direction, the differential signals to the HDMI sink 30 on the three TMDS channels #0, #1, and #2 through the HDMI cable 40.

Further, the transmitter 21 transmits a pixel clock in synchronism with pixel data transmitted on the three TMDS channels #0, #1, and #2 to the HDMI sink 30 connected through the HDMI cable 40 on a TDMS clock channel.

Here, 10-bit pixel data is transmitted on one TMDS channel #i (i=0, 1, 2) in one-clock period of a pixel clock.

The HDMI sink 30 receives the differential signal corresponding to the pixel data transmitted in one direction from the HDMI source 20 through a plurality of channels in an effective image interval.

The HDMI sink 30 receives the differential signal, corresponding to the audio data and the control data, transmitted in one direction from the HDMI source 20 on a plurality of channels in a horizontal blanking interval or a vertical blanking interval.

That is to say, the HDMI sink 30 has a receiver 31.

The receiver 31 receives the differential signal corresponding to the pixel data and the differential signal corresponding to the audio data and the control data, which are transmitted from the HDMI source 20 on the TMDS channels #0 to #2 through the HDMI cable 40 in synchronism with the pixel clock of the TDMS clock channel.

The DDC 42 is formed by two signal lines, not shown in the figure, included in the HDMI cable 40.

The DDC 42 is used for the HDMI source 20 to read E-EDID (Enhanced Extended Display Identification Data) from the HDMI sink 30 connected through the HDMI cable 40.

The HDMI sink 30 has an EDID ROM (Read Only Memory) 32 which stores the E-EDID, which is information on settings and a performance of the HDMI sink 30 in addition to the receiver 31.

The HDMI source 20 reads the E-EDID stored in the EDID ROM 32 of the HDMI sink 30 from the HDMI sink 30 connected through the HDMI cable 40 through the DDC 42.

The HDMI source 20 recognizes the settings and the performance of the HDMI sink 30 on the basis of the E-EDID.

That is to say, the HDMI source 20 recognizes, for example, a format (profile) of an image supported by the HDMI sink 30 (an electronics apparatus thereof), for example, RGB (Red, Green, Blue), YCbCr4:4:4, or YCbCr4:2:2, etc.

In this regard, although not shown in the figure, the HDMI source 20 also stores E-EDID in the same manner as the HDMI sink 30, and can transmit the E-EDID to the HDMI sink 30 as necessary.

In the above, a description has been given of a basic configuration to the communication system 10 of the HDMI specification.

Figure 2:
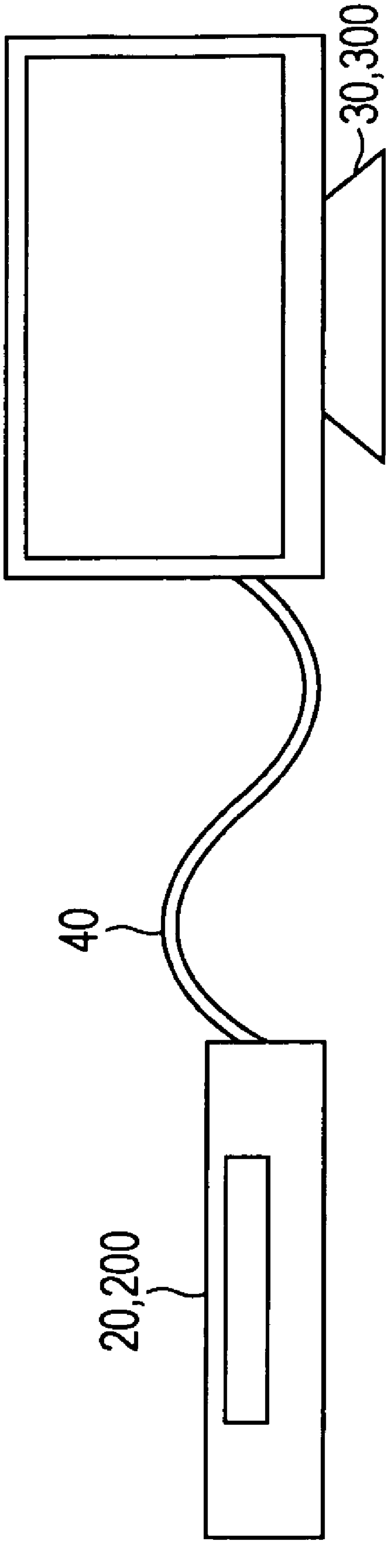
FIG. 2 is a diagram illustrating an example of specific connection of a communication system according to an embodiment of the present invention.

FIG. 2 is a diagram illustrating an example of specific connection of a communication system according to an embodiment of the present invention.

In the following, as shown in FIG. 2, a description will be given of a specific case where an optical-disc recording and playback apparatus (information processing apparatus) 200, such as a DVD, etc., is employed as the HDMI source 20, and a television receiver 300 is employed as the HDMI sink 30.

Here, the optical-disc recording and playback apparatus 200 as the HDMI source 20 has a function of the SBM processing.

The optical-disc recording and playback apparatus 200 sends a determination signal (determination flag) in order to inform the HDMI sink 30 that the video signal has been subjected to the SBM processing in addition to the video signal at the time of outputting video signal having been subjected to the SBM processing.

The television receiver 300 as the HDMI sink 30 is allowed to inform a display device, etc., without reducing the SBM effect by changing signal processing in accordance with the determination signal.

2. Second Embodiment

Figure 3:
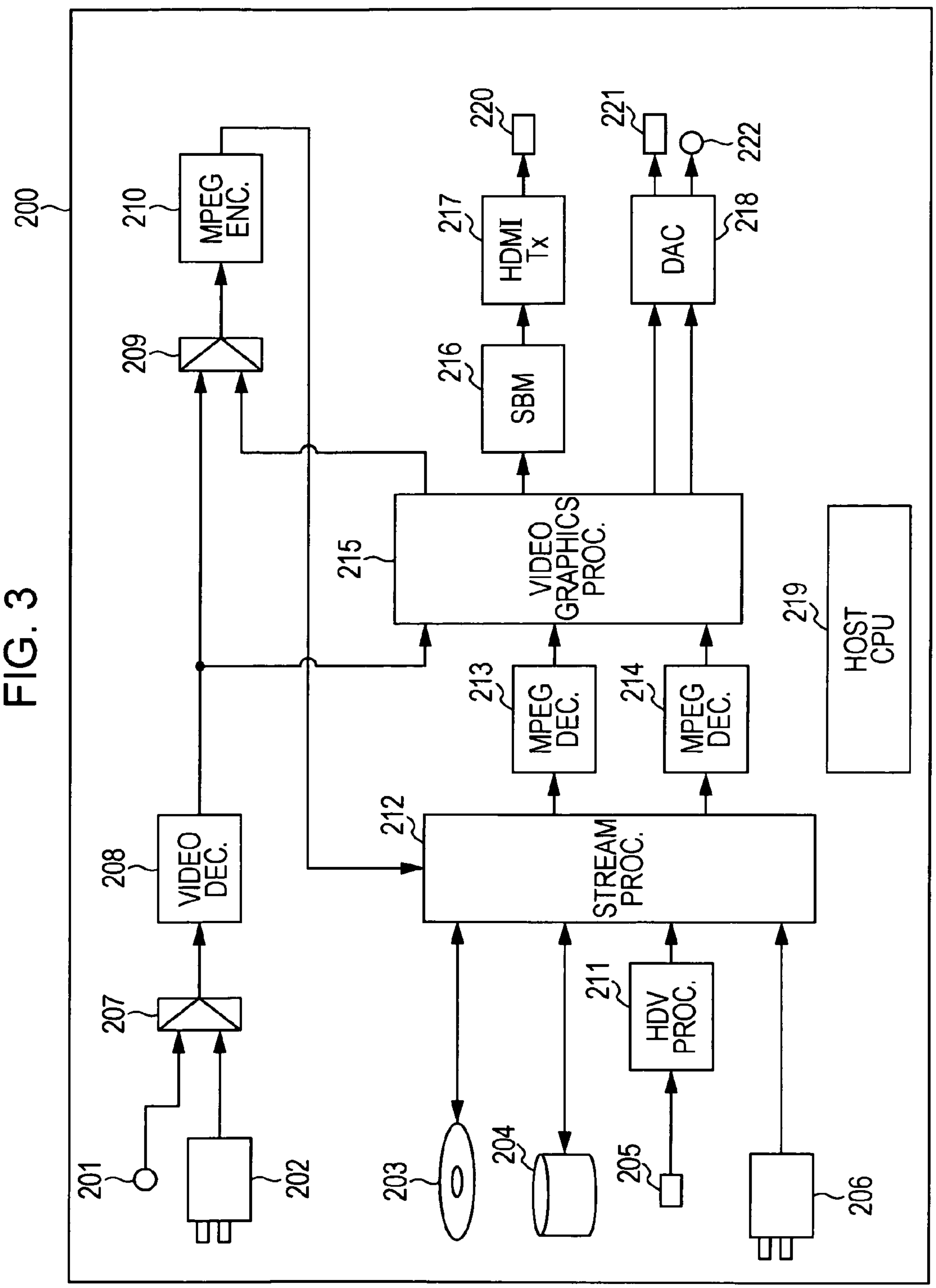
FIG. 3 is a block diagram illustrating an example of a configuration of an optical-disc recording and playback apparatus as a source device having a one-dimensional SBM processing function according to a second embodiment of the present invention.

FIG. 3 is a block diagram illustrating an example of a configuration of an optical-disc recording and playback apparatus as a source device having a one-dimensional SBM processing function according to a second embodiment of the present invention.

The optical-disc recording and playback apparatus (in the following, called a recording and playback apparatus) 200 according to the present embodiment employs a function of one-dimensional super mapping (SBM: Super Bit Mapping) processing.

Here, the SBM processing is a technique which makes it possible to transmit a signal without dropping multiple-bit components by adding high-frequency noises in accordance with human visual characteristics at the time of rounding a multiple-bit signal processing result into a certain number of bits.

The recording and playback apparatus (in the following, called a recording and playback apparatus) 200 according to the present embodiment is an apparatus which is capable of recording a video content provided from the outside onto a recording medium, such as a hard disk drive (HDD), an optical disc, etc., and is capable of playing back the video content recorded on the recording medium.

The recording and playback apparatus 200 is, for example, a combination apparatus of an optical disc recorder using an optical disc as a recording medium and an HDD recorder using a hard disk as a recording medium.

The video content includes, for example, a program content of a television broadcasting received from a broadcasting station, a video program input from the outside, a sell DVD, a video program read from a BD (Blu-ray Disc (registered trademark)), etc.

In this regard, television broadcasting includes broadcasting of program contents through broadcast waves, for example, such as terrestrial digital/analog broadcasting, BS (Broadcasting Satellite) broadcasting, CS (Communication Satellite) broadcasting, etc.

Further, the television broadcasting includes delivery of program contents through a network, such as cable television broadcasting, IPTV (Internet Protocol TV) or VOD (Video On Demand), etc.

The recording and playback apparatus 200 has a line input terminal 201, an analog tuner 202, a disc drive 203, a hard disk drive 204, an i.LINK input terminal 205, a digital tuner 206, a selector 207, and a video recorder 208.

The recording and playback apparatus 200 has a selector 209, an MPEG encoder 210, an HDV processor 211, a stream processor 212, MPEG decoders 213 and 214, a video graphic processor 215, and an SBM processing section 216.

The recording and playback apparatus 200 has an HDMI transfer section (Tx) 217, digital-analog converter (DAC) 218, a host CPU 219, an HDMI connector 220, a component terminal 221, and a composite terminal (S terminal) 222.

An analog video signal is input into the line input terminal 201 from an external apparatus. The input analog video signal is supplied to the selector 207.

The analog tuner 202 selects a target channel from the broadcast waves received by an analog broadcasting antenna not shown in the figure, performs demodulation processing of the radio wave of the channel, and generates receive signal (video and audio analog signal) of a program content.

Further, the analog tuner 202 performs predetermined video-signal processing, for example, amplification processing of an intermediate frequency, color-signal separation, color-difference-signal generation, synchronization-signal extraction, etc., on the receive signal, and outputs a video signal to the selector 207.

The disc drive 203 writes and reads various kinds of information onto and from an optical disc, which is a recording medium.

For example, the disc drive 203 loads a commercially-available removable recording medium (a sell DVD, a BD, etc.) on which a video content is recorded so that the disc drive 203 can read and play back the video content.

The disc drive 203 exchanges data with the stream processor 212.

The hard disk drive 204 writes and reads various kinds of information onto and from a hard disk, which is a recording medium.

For example, the hard disk drive 204 records a video/audio-signal stream input from the stream processor 212 into the hard disk.

Also, the hard disk drive 204 reads data recorded in the hard disk, and outputs the data to the stream processor 212.

In this manner, the recording and playback apparatus 200 according to the present embodiment has the two recording apparatuses, that is to say, the disc drive 203 and the hard disk drive 204.

Thus, the recording and playback apparatus 200 can records the content recorded in the hard disk drive 204 to the disc drive 203, and vice versa.

In this regard, any recording medium can be used as a recording medium. For example, a magnetic disk, such as a hard disk, etc., a next-generation DVD (Blu-Ray disc, etc.), a DVD-R, a DVD-RW, a DVD-RAM, etc., can be used.

Alternatively, for example, any recording medium, for example, an optical disc such as a magneto-optical disc, various kinds of semiconductor memory such as a flash memory, etc., can be used as a recording medium.

Also, the recording medium may be a recording medium fixed in the recording and playback apparatus 200, or a removable recording medium which is removable from the recording and playback apparatus 200.

An external apparatus, such as a digital video camera of the HDV (High Definition Video) system is connected to an external input terminal, such as the i.LINK input terminal 205, etc.

The video and audio HDV signals (stream) transferred from the external apparatus by the IEEE1394 method are supplied to the i.LINK input terminal 205, and are input into the stream processor 212 through the HDV processor 211.

The digital tuner 206 selects a target channel from the broadcast waves received by a satellite broadcasting or a terrestrial digital broadcasting antenna, and outputs video and audio digital data (a bit stream) of a program content of the channel to the stream processor 212.

The selector 207 selects either an analog video signal from an external apparatus, which is input through the line input terminal 201, or an analog video signal by the analog tuner 202, and outputs the signal to the video recorder 208.

The video recorder 208 converts (A/D conversion), for example, an input analog video signal of the NTSC format into a digital signal, then separates the signal into a luminance signal and a chroma signal, and performs decoding processing.

The video recorder 208 outputs the decoded baseband video signal to the selector 209 and the video graphic processor 215.

The selector 209 selects either an output from the video recorder 208, or an output from the video graphic processor 215, and outputs the selected output signal to the MPEG encoder 210.

The MPEG encoder 210 performs requested encoding, such as MPEG1, MPEG2, MPEG4, MPEG4-AVC/H.264, etc. The encoded stream is input into the stream processor 212.

The MPEG encoder 210 performs compression coding on the video and the audio digital signal from the video recorder 208 and the video graphic processor 215 in a predetermined compression coding format.

The MPEG encoder 210 is a high-performance encoder compliant with, for example, a HD (High Definition) video and an SD (Standard Definition) video. That is to say, the MPEG encoder 210 is capable of encoding not only the video signal of an SD resolution, but also the video signal of an HD resolution.

Also, the MPEG encoder 210 is an encoder compliant with stereo sound and multi-channel sound, and can encode not only a two-channel audio signal, but also a multi-channel audio signal.

The MPEG encoder 210 encodes a video signal or an audio signal of a content to be recorded at a bit rate corresponding to the recording mode determined by the host CPU 219.

The MPEG encoder 210 outputs the compressed data (bit stream) of the video and the audio signals encoded in this manner to the stream processor 212.

At recording time, the stream processor 212 sends a stream to the disc drive 203 of a BD, a DVD, etc., or the disk drive 204 of a hard disk, etc., and records the stream onto a requested medium.

At display or playback time, the stream processor 212 extracts and parses a requested video stream, and then sends the stream to the MPEG decoders 213 and 214.

The stream processor 212 performs predetermined data processing on data (stream) to be recorded or played back at the time of recording data onto or playing back data from a recording medium.

For example, at data recording time, the stream processor 212 multiplexes and encrypts the compressed data encoded by the MPEG encoder 210, and records the data onto a recording medium while performing buffer control.

Also, at data playback time, the stream processor 212 decrypts and demultiplexes the compressed data read from a recording medium, and outputs the data to the MPEG decoders 213 and 214.

The MPEG decoders 213 and 214 are pieces of hardware as examples of a decoding section decoding the compressed video and audio signals.

The MPEG decoders 213 and 214 decode (expands the compressed data) the video and the audio compressed data input through the stream processor 212 in a predetermined compression coding method.

For the compression coding method (codec type) used by the MPEG encoder 210 and the MPEG decoders 213 and 214, for example, MPEG2, H.264 AVC (Advanced Video Coding), VC1, etc., can be used on video.

Also, for example, Dolby AC3, MPEG2 AAC (Advanced Audio Coding), LPCM (Linear Pulse Code Modulation), etc., can be used on audio.

Also, as described above, video and audio signals having various kinds of formats are input into the recording and playback apparatus 200 from the outside. The video signal formats (image sizes) include, for example, "480i", "480p", "720p", "1080i", "1080p", etc., in response to the quality of the video.

For example, "1080i" represents a video signal having a number of effective scanning lines in the vertical direction of 1080 (a total number of scanning lines of 1125), an interlaced scanning method, and a frame rate of "30 frames/second".

The resolution of "1080i" is "1920×1080" pixels or "1440×1080" pixels.

Also, "720p" represents a video signal having a number of effective scanning lines in the vertical direction of 720 (a total number of scanning lines of 750), a progressive scanning method, and a frame rate of "60 frames/second".

The resolution of "720p" is "1280×720" pixels or "960×1080" pixels.

Among these video signal formats, the video signals of "480i" and "480p" have a small number of scanning lines, and are classified as a category of SD video (in the following, referred to as an "SD category") having a low resolution.

On the other hand, the video signals of "720p", "1080i", "1080p", etc., have a large number of scanning lines, and are classified as a category of HD video (in the following, referred to as an "HD category") having a high resolution.

Also, the audio signal formats (numbers of channels) include, for example, "1 CH", "2 CH", "5.1 CH", "6.1 CH", "7.1 CH", "4 CH", "5 CH", "6 CH", etc.

For example, "5.1 CH" represents a multi-channel audio signal output from six speakers, namely, speakers located in front of an audience, at right front, at left front, at right rear, at left rear, and a sub-woofer speaker for low frequency sounds (LFE: Low Frequency Effect).

Among these audio signal formats, the audio signals of "1 CH (mono)", "2 CH (stereo)" are classified as a category of low-quality stereo sound (in the following, referred to as a "stereo category") having a relatively small number of channels.

On the other hand, "5.1 CH", "6.1 CH", "7.1 CH", "4 CH", "5 CH", "6 CH", etc., have a relatively large number of channels, and are classified as a category of high-quality multi-channel sound (in the following, referred to as a "multi-channel category").

The video graphic processor 215 performs various kinds of video signal processing, such as conversion processing into a requested frame size, image-quality adjustment, noise reduction, etc., combines this video signal and the graphics signal, etc., and then outputs the signal to the SBM processing section 216.

Also, the output of the video graphic processor 215 is input into the DAC 218, and the analog component signal having been D/A converted is output to the component terminal 221.

Also, the analog composite video signal (or Y/C separate video signal) having been D/A converted is output to the composite video terminal (or S terminal) 222.

The SBM processing section 216 performs SBM processing to generate a baseband signal (video signal).

The SBM processing section 216 outputs, to the HDMI transfer section 217, an additional determination signal (flag) for informing the HDMI sink 30 that the SBM processing has been performed together with a baseband video signal at the time of outputting the baseband video signal having been subjected to the SBM processing.

It becomes possible for the television receiver 300, as the HDMI sink 30, to give information to a display device, etc., without reducing the effectiveness of the SBM by changing signal processing in accordance with the determination signal.

Figure 4:
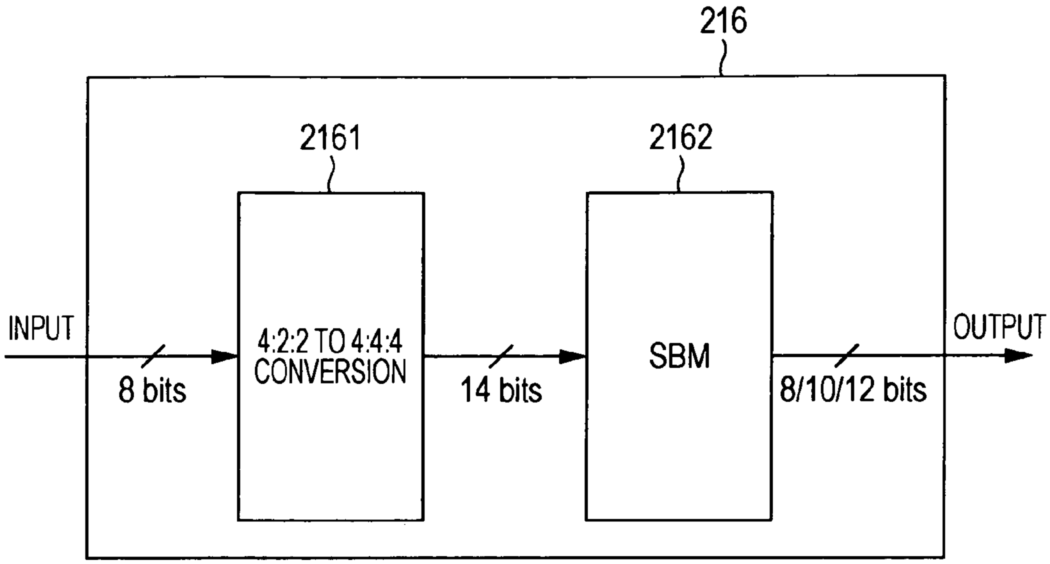
FIG. 4 is a block diagram illustrating an example of a configuration of an SBM processing section.

FIG. 4 is a block diagram illustrating an example of a configuration of the SBM processing block 216.

The SBM processing section 216 in FIG. 4 has a 4:2:2 to 4:4:4 conversion block 2161, and an SBM block 2162.

The 4:2:2-to-4:4:4 conversion block 2161 receives the 8-bit baseband video signal processed by the video graphic processor 215, and performs up-sampling processing of the color signal.

The 4:2:2-to-4:4:4 conversion block 2161 expands the original 8-bit signal to 14 bits by various calculations in the process of up-sampling the color signal, and outputs the signal to the SBM block 2162.

The SBM block 2162 performs the SBM processing on the input 14-bit baseband video signal, and adds a determination signal (determination flag) for informing the HDMI sink 30 that the SBM processing has been performed, and then outputs the signals.

In this regard, the SBM block 2162 selects 8/10/12-bit output in accordance with the connected apparatus information obtained from the EDID of the HDMI at the time of outputting.

Next, descriptions will be given of the case of transmitting the determination flag to the television receiver together with the baseband video signal having been subjected to the SBM processing.

A first example is the case of independently defining SDI (Source Device Information) in SPDI (Source Product Description Infoframe) defined by the HDMI standard.

By this means, whether or not the SBM processing has been performed on the baseband video signal transmitted through HDMI is transmitted.

For example, a vendor code or a category code can be transmitted in the SDI, and thus it is possible to define the category code independently to use the code as a determination flag.

A second example is the case of using CEC (Consumer Electronics Control) defined by HDMI.

Vendor specific commands are allocated to CEC, and thus a specific command can be added in order to send the determination flag.

In either case, the host CPU 219 controls to turn ON/OFF of the SMB processing, and thus the determination flag is sent to HDMI in accordance with the ON/OFF.

Here, a description will be given of an example of a configuration of a gradation-conversion section, which is a substantial section of the SBM processing section.

Figure 5:
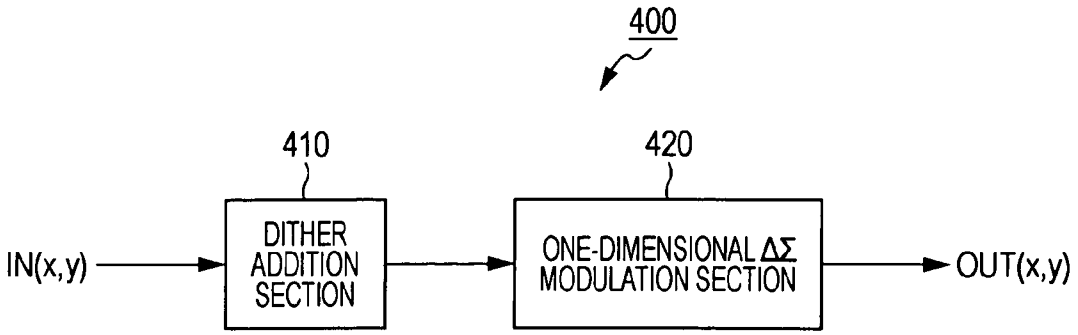
FIG. 5 is a block diagram illustrating an example of a configuration of a gradation-conversion section, which is a substantial section of an SBM processing section according to the present embodiment.

FIG. 5 is a block diagram illustrating an example of a configuration of the gradation-conversion section, which is a substantial section of an SBM processing section according to the present embodiment.

A gradation-conversion section 400 has a function of converting grayscale, in which, for example an 8-bit-image signal is expanded into a 14-bit-image video signal by noise reduction processing, and then the video signal is converted into a signal having the number of bits, for example 8 bits, bits, and 12 bits allowed to be displayed on a display device.

The gradation-conversion section 400 has a dither addition section 410 and a one-dimensional delta-sigma modulation section 420.

The dither addition section 410 performs dithering on a target image by adding random noise to a pixel value IN (x, y) forming the target image, and outputs a resultant image to the one-dimensional delta-sigma modulation section 420.

The one-dimensional delta-sigma modulation section 420 performs one-dimensional delta-sigma modulation on the target image having subjected to dithering by the dither addition section 410, and outputs an image as an image of the gradation-conversion section 400 formed by the resultant pixel values OUT (x, y).

Figure 6:
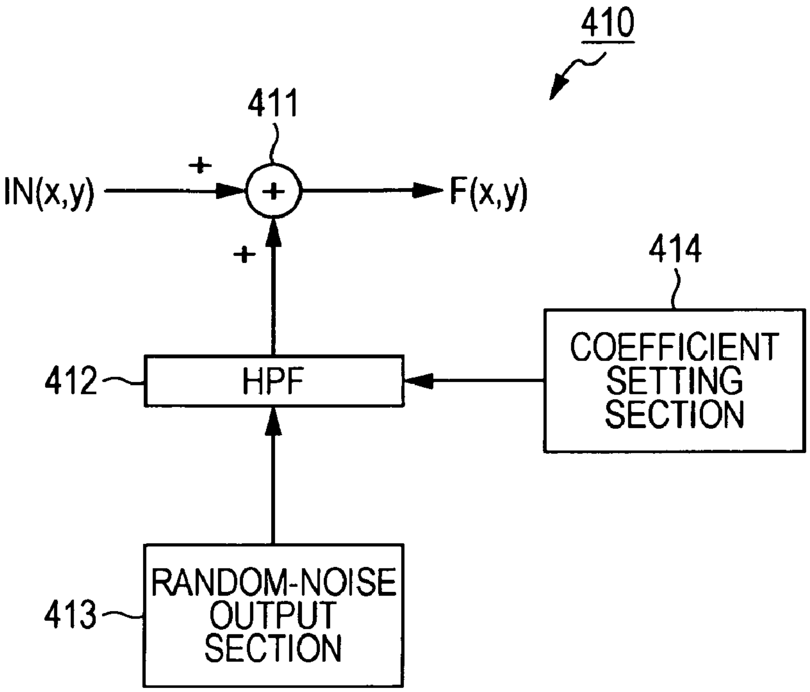
FIG. 6 is a diagram illustrating an example of a configuration of a dither addition section in FIG. 5.

FIG. 6 is a diagram illustrating an example of a configuration of the dither addition section 410 in FIG. 5.

As shown in FIG. 6, the dither addition section 410 has a calculation section 411, a high-pass filter (HPF: High Pass Filter) 412, a random-noise output section 413, and a coefficient-setting section 414.

Figure 7:
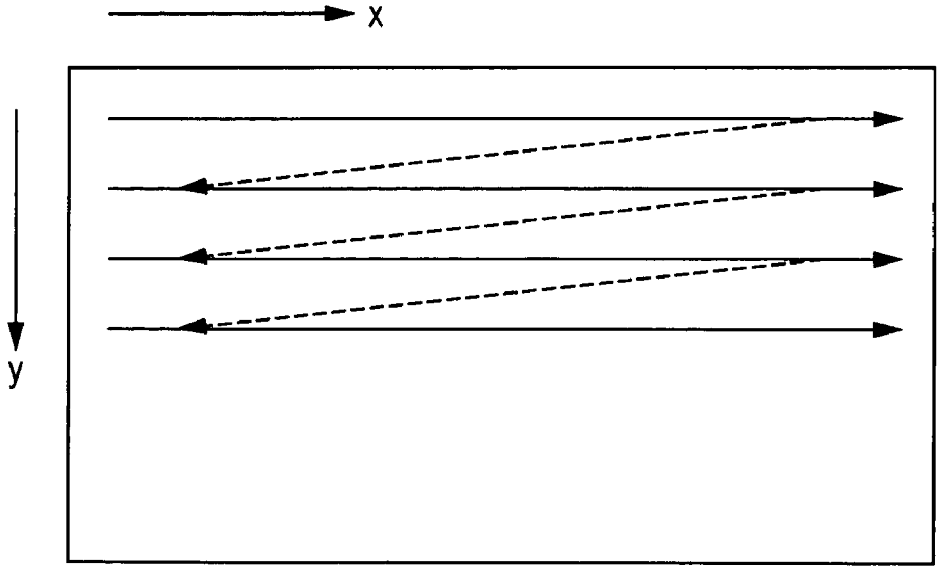
FIG. 7 is a diagram illustrating an order of pixels to be subjected to gradation-conversion processing.

As shown in FIG. 7, the pixel value IN (x, y) of the target image is supplied to the calculation section 411 in the sequence of raster scan.

Also, the output of the HPF 412 is supplied to the calculation section 411.

The calculation section 411 adds the output of the HPF 412 to the pixel value IN (x, y) of the target image, and supplies the resultant sum value to the one-dimensional delta-sigma modulation section 420 as the pixel value F (x, y) having been subjected to dithering.

The HPF 412 filters random noise output from the random-noise output section 413 on the basis of the filter coefficient set by the coefficient-setting section 414, and supplies high-frequency components of the random noise obtained as the result of the filtering to the calculation section 411.

The random-noise output section 413 generates, for example, random noise in accordance with a Gaussian distribution, etc., and outputs the noise to the HPF 412.

The coefficient-setting section 414 basically determines a filter coefficient HPF-CE1, HPF-CE2, or HPF-CE3 on the basis of the spatial frequency characteristic of human visual sense and the resolution of a display device, and sets the coefficients in the HPF 412.

In the present embodiment, the coefficient-setting section 414 selects any one of the filter coefficients HPF-CE1, HPF-CE2, and HPF-CE3 in accordance with a control instruction of the host CPU 219.

As described above, in the dither addition section 410, the coefficient-setting section 414 selects any one of the filter coefficients of the HPF 412, HPF-CE1, HPF-CE2, and HPF-CE3 in accordance with an instruction of the host CPU 219.

The HPF 412 filters random noise output from the random-noise output section 413 by performing sum-of-products calculation of the filter coefficient set by the coefficient-setting section 414 and the random noise output from the random-noise output section 413, etc.

By this means, the HPF 412 supplies high-frequency components of the random noise to the calculation section 411.

The calculation section 411 adds the 14-bit pixel value IN (x, y) of the target image and the high-frequency components of the random noise from the HPF 412.

The calculation section 411 outputs, for example, the resultant 14-bit sum value, which has the same number of bits as the target image or more, to the one-dimensional delta-sigma modulation section 420 as the pixel value F (x, y) having been subjected to dithering.

The host CPU 219 functions as a calculation processing unit and a control unit in order to control each unit in the recording and playback apparatus 200.

The host CPU 219 performs various kinds of processing using the RAM in accordance with the program stored in the ROM or the program loaded in the RAM.

Also, the host CPU 219 also functions as an attribute-information acquisition section, an analysis section, a control-routine creation section, an image-quality adjustment control section, etc.

The host CPU 219 controls to turn ON/OFF of the SMB processing, and controls to send the determination flag to the HDMI accordingly.

The host CPU 219 changes filter coefficients of the HPF 412 of the dither addition section 410, HPF-CE1, HPF-CE2, and HPF-CE3.

The host CPU 219 has a function of accepting a user input onto a user interface not shown in the figure, controlling recording processing and playback processing of a content, and setting reserved recording of a broadcasting program on the basis of the user input.

In the above, a description has been given of the configuration and the function of the recording and playback apparatus 200 as the HDMI source 20.

Next, a description will be given of a configuration and a function of the television receiver 300 as the HDMI sink 30.

3. Third Embodiment

Figure 8:
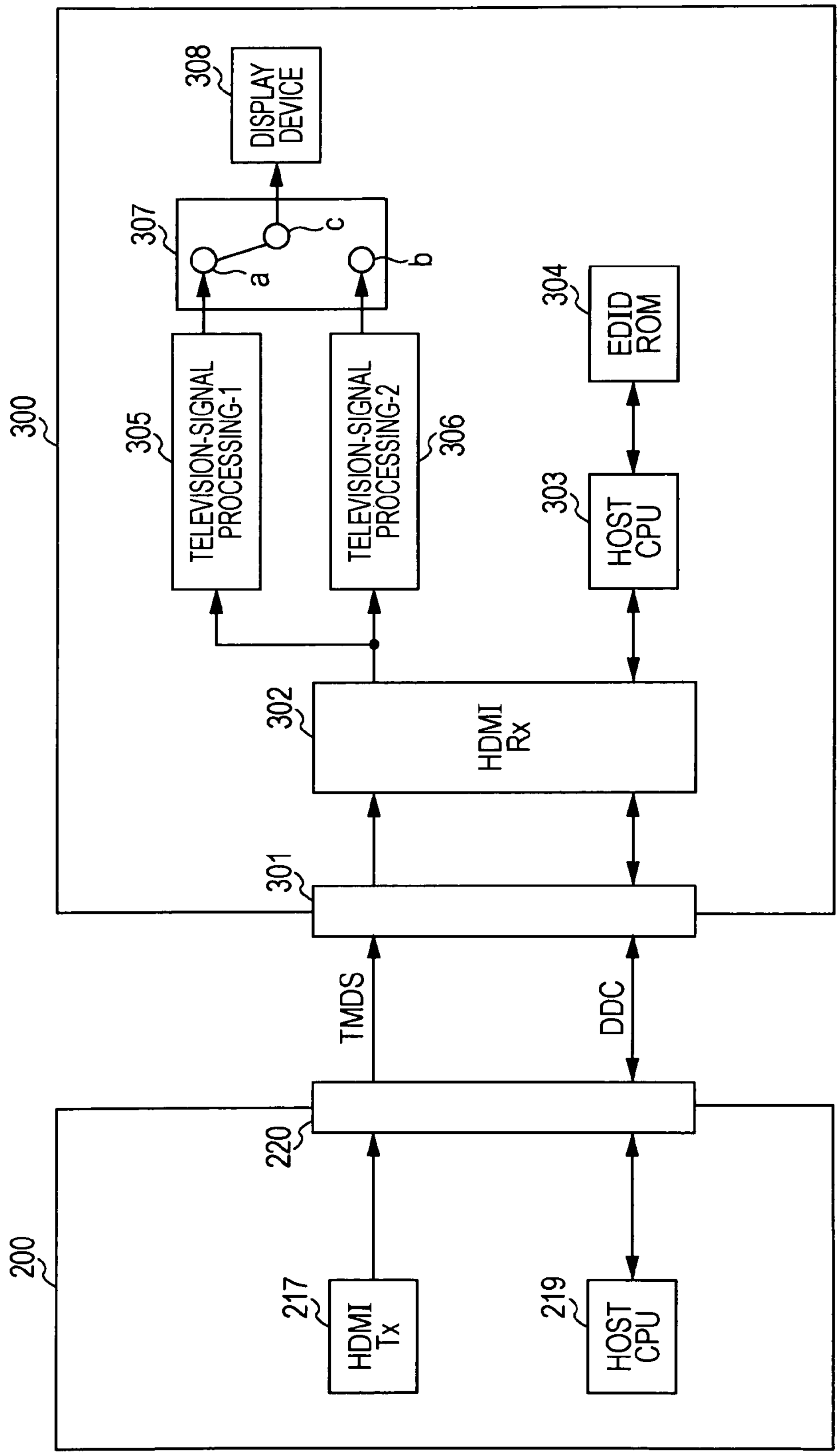
FIG. 8 is a diagram illustrating an example of a configuration of a television receiver as an HDMI.

FIG. 8 is diagram illustrating an example of a configuration of a television receiver as an HDMI.

As shown in FIG. 8, the television receiver 300 as the HDMI sink 30 is connected to the recording and playback apparatus 200, as the HDMI source 20, through the HDMI cable 40.

The television receiver 300 in FIG. 8 has an HDMI connector 301, an HDMI receiving section (Rx) 302, a host CPU 303, and an EDID ROM 304.

Further, the television receiver 300 has a first television-signal processing section 305, a second television-signal processing section 306, a switching section 307, and a display device 308.

The HDMI receiving section 302 receives TMD signals of TMD channels input through the HDMI connector 301, and supplies the signals to the first and the second television-signal processing sections 305 and 306.

The HDMI receiving section 302 supplies the determination signal (determination flag) added to the received baseband video signal to the host CPU 303.

The host CPU 303 receives the determination signal (determination flag), determines whether the received baseband video signal has been subjected to the SBM processing, and performs driving of the first and the second television-signal processing sections 305 and 306 in accordance with the determination result and switching control of the switching section 307.

If the host CPU 303 determines that the SBM processing has not been performed, the host CPU 303 performs control so that the first television-signal processing sections 305 normally processes the received baseband video signal. Also, the host CPU 303 controls the switching section 307 so that the processed signal is supplied to the display device 308.

If the host CPU 303 determines that the SBM processing has been performed, the host CPU 303 performs control so that the second television-signal processing sections 306 passes through the received baseband video signal. Also, the host CPU 303 controls the switching section 307 so that the passed signal having been subjected to the SBM processing is supplied to the display device 308.

Also, the host CPU 303 obtains display information written in the EDID ROM 304, and transfers the information to the recording and playback apparatus 200 through the HDMI receiving section 302, the HDMI connector 301, and the DDC line 42 of the HDMI cable 40.

In addition to the compliant resolution information of the receiver, etc., bit-length information of the compliant baseband signal is also written in the EDID ROM 304.

The host CPU 219 of the recording and playback apparatus 200 having obtained the information gives an instruction to the SBM processing section 216 to produce 12-bit output if the receiver 300 connected through the HDMI cable 40 supports 12-bit input.

If the receiver 300 supports up to 8 bits, the host CPU 219 gives an instruction to the SBM processing section 216 to produce 8-bit output, outputting suitable bits from the HDMI connector 220.

The first television-signal processing section 305 performs normal signal processing on the baseband signal received by the HDMI receiving section 302 and having not been subjected to the SBM processing to be output to the switching section 307.

The second television-signal processing section 306 performs through processing, etc., on the baseband signal received by the HDMI receiving section 302 and having been subjected to the SBM processing to be output to the switching section 307.

For example, the second television-signal processing section 306 passes through an input 4:4:4 signal without converting into 4:2:2, and thus can maintain the effect of the SBM.

In the switching section 307, a terminal a is connected to the output of the first television-signal processing section 305, a terminal b is connected to the output of the second television-signal processing section 306, and a fixed terminal (output terminal) c is connected to the display device 308.

The switching section 307 is subjected to switching control by the host CPU 303.

If the switching section 307 determines that the host CPU 303 has not performed the SBM processing, the switching section 307 switches so as to connect the terminal a and the terminal c.

If the switching section 307 determines that the host CPU 303 has performed the SBM processing, the switching section 307 switches so as to connect the terminal b and the terminal c.

Next, a description will be given of operations of the playback apparatus 200 shown in FIG. 3 and the television receiver 300 in FIG. 8 separately into a recording system, a display system, and a reading system.

Operation of Recording System

A requested input is selected from the video signal input from the line input terminal 201 or the video signal output from the analog tuner 202 by the selector 207, and then the selected signal is input into the video decoder 208.

The video decoder 208 performs A/D conversion on the input analog video signal of the NTSC system, and then separates a luminance signal and a chroma signal. The video decoder 208 performs decoding processing on the signals, and the decoded baseband video signals are input into the selector 209 and the video graphic processor 215.

The selector 209 selects one of the output from the video decoder 208 and the output from the video graphic processor 215, and then the output is input into the MPEG encoder 210.

The MPEG encoder 210 performs predetermined encoding, such as MPEG1, MPEG2, MPEG4, MPEG4-AVC/H.264, etc., and the encoded stream is input into the stream processor 212.

The stream is sent from the stream processor 212 to the disc drive 203 of, such as a BD, a DVD, etc., and a disk drive, such as a hard disk drive 204, etc., and is recorded on a requested medium.

Also, the stream having been input from the i.LINK input terminal 205 is input into the stream processor 212 through the HDV processor 211.

Also, the stream from the digital tuner 206 is input into the stream processor 212, and can be recorded on a requested medium by the disc drive 203 of, such as a BD, a DVD, etc., and a disk drive, such as a hard disk drive 204, etc.

Also, the stream having been input into the stream processor 212 is subjected to processing, such as extraction of a requested video stream and parsing by the stream processor 212, and then is decoded by the MPEG decoders 213 and 214. The decoded signal is input into the MPEG encoder 210 through the video graphic processor 215 and the selector 209.

The MPEG encoder 210 performs a requested encoding, such as MPEG1, MPEG2, MPEG4, MPEG4-AVC/H.264, etc. The encoded stream is input into the stream processor 212.

The stream processor 212 sends the stream to the disc drive 203 of a BD, a DVD, etc., or the disk drive 204 of a hard disk, etc., and records the stream onto a requested medium.

Operation of Display System

A requested input is selected from the video signal input from the line input terminal 201 and the video signal output from the analog tuner 202 by the selector 207, and then the selected signal is input into the video decoder 208.

The video decoder 208 performs A/D conversion on the input analog video signal of the NTSC system, and then separates a luminance signal and a chroma signal. The video decoder 208 performs decoding processing on the signals, and the decoded baseband video signals are input into the video graphic processor 215.

The video graphic processor 215 performs various kinds of video signal processing, such as conversion processing into a requested frame size, image-quality adjustment, noise reduction, etc., and combines this video signal and the graphics signal, etc.

The signal having been subjected to the processing by the video graphic processor 215 is sent to the SBM processing section 216.

In the SBM processing section 216, first, the signal is input into the 4:2:2-to-4:4:4 conversion block 2161, and up-sampling processing of the color signal is performed.

In the process of up-sampling the color signal, the original 8-bit signal is expanded to 14 bits by various calculations, and is input into the next SBM block 2162.

The SBM block 2162 performs SBM processing on the input 14-bit baseband video signal, and adds a determination signal (determination flag) for informing whether the SBM processing has been performed or not, and then outputs the signals.

When the determination flag is transmitted to the receiver 300 simultaneously with the baseband video signal having been subjected to the SBM processing, for example, the following processing is performed.

That is to say, SDI in SPDI, which is defined in the HDMI standard, is defined as a specific flag, and information of whether or not the SBM processing has been performed on the baseband video signal transmitted through HDMI is transmitted.

Next, the baseband video signal having been subjected to the SBM processing is sent to the HDMI transfer section 217. In the HDMI transfer section 217, the input baseband video signal is converted into the TMDS signal, and is output together with the control signal to the HDMI connector 220.

Also, the output of the video graphic processor 215 is input into the DAC 218, and the analog component signal having been D/A converted is output to the component terminal 221. Also, the analog composite video signal (or Y/C separate video signal) having been D/A converted is output to the composite video terminal (or S terminal) 222.

Also, the stream input from the i.LINK input terminal 205 is input into the stream processor 212 through the HDV processor 211, and the stream from the digital tuner 206 is also input into the stream processor 212.

The stream processor 212 performs processing, such as extraction of a requested video stream and parsing, and then sends the stream to the MPEG decoders 213 and 214. The baseband video signal decoded by the MPEG decoders 213 and 214 is input into the video graphic processor 215.

The video graphic processor 215 performs various kinds of video signal processing, such as conversion processing into a requested frame size, and combines this video signal and the graphics signal, etc., and then outputs the signal to the SBM processing section 216.

The SBM processing section 216 performs the same SBM processing as described above.

Next, the baseband video signal having been subjected to the SBM processing is sent to the HDMI transfer section 217. In the HDMI transfer section 217, the input baseband video signal is converted into the TMDS signal, and is output to the HDMI connector 220 together with the control signal.

Also, the output of the video graphic processor 215 is input into the DAC 218, and the analog component signal having been D/A converted is output to the component terminal 221. Also, the analog composite video signal (or Y/C separate video signal) having been D/A converted is output to the composite video terminal (or S terminal) 222.

Operation of Playback System

A stream played back by the disc drive 203 of a BD, a DVD, etc., or the hard disk drive 204 is input into the stream processor 212.

The stream processor 212 performs extraction of a requested video stream and parsing, and then sends the stream to the MPEG decoders 213 and 214.

The baseband video signals decoded by the MPEG decoders 213 and 214 are input into the video graphic processor 215.

The video graphic processor 215 performs various kinds of video signal processing, such as conversion processing into a requested frame size, and combines this video signal and the graphics signal, etc., and then outputs the signal to the SBM processing section 216.

The SBM processing section 216 performs the same SBM processing as described above.

Next, the baseband video signal having been subjected to the SBM processing is sent to the HDMI transfer section 217. In the HDMI transfer section 217, the input baseband video signal is converted into the TMDS signal, and is output to the HDMI connector 220 together with the control signal.

Also, the output of the video graphic processor 215 is input into the DAC 218, and the analog component signal having been D/A converted is output to the component terminal 221. Also, the analog composite video signal (or Y/C separate video signal) having been D/A converted is output to the composite video terminal (or S terminal) 222.

In this regard, at the time of outputting, a selection is made from 8/10/12 bits in accordance with the connection apparatus information obtained from the EDID of the HDMI.

The selection is made of the output bits of the baseband video signal having been subjected to the SBM processing as follows.

As described in the above playback system, the baseband video signal is decoded by the MPEG decoders 213 and 214, and then is sent to the HDMI transfer section 217 through the video graphic processor 215 and the SBM processing section 216.

Also, the host CPU 219 performs communication with the receiver 300 through the DCC line 42 of the HDMI cable 40 connected to the HDMI connector 220.

Thereby, the host CPU 219 obtains display information written in the EDID ROM 304 through the HDMI receiving section 302 built in the receiver 300 and the host CPU 303.

If the receiver 300 connected through the HDMI cable is compliant with 12-bit input, the host CPU 219 of the recording and playback apparatus 200, which has obtained the information, gives an instruction to the SBM processing section 216 to produce 12-bit output.

If the receiver 300 is only compliant with up to 8 bits, the host CPU 219 gives an instruction to the SBM processing section 216 to produce 8-bit output, and outputs suitable bits from the HDMI connector 220.

And, a description will be given of an example of an operation of the receiving apparatus 300 having received the determination flag.

The HDMI receiving section 302, which has received the TMDS signal, transmits the baseband video signal to the first television-signal processing sections 305 and the second television-signal processing section 306.

The first television-signal processing sections performs normal signal processing when the SBM processing has not been performed, and the second television-signal processing section 306 performs exclusive processing for the baseband video having been subjected to the SBM processing.

For example, the second television-signal processing section 306 passes through an input 4:4:4 signal without converting into 4:2:2, and thus can maintain the effect of the SBM.

The host CPU 303 switches the switching section 307 in accordance with the determination flag described above, and supplies a suitable baseband signal to the display device 308.

As described above, when a recording and playback apparatus 200 according to the present embodiment outputs a baseband video signal having been subjected to the SBM processing, the recording and playback apparatus 200 transmits a determination flag together with the baseband video signal. Accordingly, it is possible for a sink device to perform an optimum signal processing on the basis of the information. As a result, it becomes possible for the user to enjoy the video at an optimum image quality all the time.

In this regard, the method described above in detail can be formed as a program in accordance with the above-described procedure, and can be executed by a computer, such as a CPU.

Also, such a program can be configured to be executed on a computer in which a recording medium, such as a semiconductor memory, a magnetic disk, an optical disc, a floppy (registered trademark) disk, etc., are set and accessed.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:

a processing system performing processing on an original image, wherein the processing system receives the original image as a plurality of eight bit signals and outputs image data as a plurality of fourteen bit signals; and a gradation conversion section having a gradation conversion function of receiving the image data from the processing system, the gradation conversion section converting the fourteen bit signals of the image data to an output image comprising one of eight, ten and twelve bit signals, wherein the gradation conversion section expresses pseudo grayscales before the gradation conversion in a grayscale converted image, the gradation conversion section being capable of changing the gradation conversion function and performing conversion processing on the image, wherein the gradation conversion section adds a determination flag to the output image indicating whether the gradation conversion processing has been performed at the time of outputting the output image.

2. The information processing apparatus according to claim 1, further comprising an HDMI transfer section being compliant with an HDMI standard, wherein the gradation conversion section uses a predetermined code defined by the HDMI standard as the determination flag.

3. The information processing apparatus according to claim 1, further comprising an HDMI transfer section being compliant with an HDMI standard, wherein the gradation conversion section adds a predetermined command in accordance with a specification defined by the HDMI standard, and uses the command as the determination flag.

4. A method of processing an image, comprising the steps of:

performing processing on an original image by a processing system, wherein the processing system receives the original image as a plurality of eight bit signals and outputs image data as a plurality of fourteen bit signals;

performing a gradation conversion by a gradation conversion section using a gradation conversion function of converting the fourteen bit signals of image data to an output image comprising one of eight, ten and twelve bit signals, and expressing pseudo grayscales before the gradation conversion in a grayscale converted image in accordance with change control; and adding and outputting a determination flag to the output image indicating whether the gradation conversion processing has been performed at the time of outputting the output image.

5. A communication system comprising:

a source device;

a sink device; and a cable connecting the source device and the sink device, wherein the source device includes a processing system performing processing on an original image, wherein the processing system receives the original image as a plurality of eight bit signals and outputs image data as a plurality of fourteen bit signals, and a gradation conversion section having a gradation conversion function of receiving the image data from the processing system, the gradation conversion section converting the fourteen bit signals of the image data to an output image comprising one of eight, ten and twelve bit signals, wherein the gradation conversion section expresses pseudo grayscales before the gradation conversion in a grayscale converted image, the gradation conversion section being capable of changing the gradation conversion function and performing conversion processing on the image, wherein the gradation conversion section adds a determination flag to the output image indicating whether the gradation conversion processing has been performed at the time of outputting the output image, and the sink device performs signal processing capable of holding an effect of the gradation conversion processing if the determination flag indicates that the gradation conversion processing has been performed.

6. The communication system according to claim 5, further comprising an HDMI transfer section being compliant with an HDMI standard, wherein the gradation conversion section uses a predetermined code defined by the HDMI standard as the determination flag.

7. The communication system according to claim 5, further comprising an HDMI transfer section being compliant with an HDMI standard, wherein the gradation conversion section adds a predetermined command in accordance with a specification defined by the HDMI standard, and uses the command as the determination flag.

* * * * *